United States Patent [19]

Boyle et al.

[11] Patent Number: 4,535,038
[45] Date of Patent: Aug. 13, 1985

[54] STRUCTURE FOR ELECTROCHEMICAL BATTERIES

[75] Inventors: Gerard H. Boyle, Concord; Roger K. Freeman, Boylston; Franz Goebel, Sudbury, all of Mass.

[73] Assignee: GTE Communications Products Corporation, Waltham, Mass.

[21] Appl. No.: 612,222

[22] Filed: May 21, 1984

[51] Int. Cl.³ .............................................. H01M 2/02
[52] U.S. Cl. .................................... 429/154; 429/162
[58] Field of Search ............... 429/153, 154, 155, 128, 429/113, 114, 115, 162

[56] References Cited

U.S. PATENT DOCUMENTS

| | | | |
|---|---|---|---|
| 2,677,716 | 5/1954 | MacFarland | 429/154 |
| 3,003,013 | 10/1961 | Duddy | 429/154 |
| 3,563,805 | 2/1969 | Dierhoi | 429/152 |
| 4,125,680 | 11/1978 | Shropshire et al. | 429/154 |
| 4,148,974 | 4/1979 | Eppley | 429/101 |
| 4,287,273 | 9/1981 | Harney et al. | 429/153 |
| 4,446,211 | 5/1984 | Goebel et al. | 429/101 |

Primary Examiner—Donald L. Walton
Attorney, Agent, or Firm—J. Stephen Yeo

[57] ABSTRACT

A battery stack has a plurality of inner frames and a plurality of outer frames. Pairs of inner and outer rings are connected by a web of porous insulating material which separates battery plates. The frames are fused together forming a unity housing with an inner electrolyte well.

2 Claims, 3 Drawing Figures

STRUCTURE FOR ELECTROCHEMICAL BATTERIES

RELATED COPENDING APPLICATION

Copending U.S. patent application Ser. No. 612,227 by Boyle et al. now abandoned, filed simultaneously with and assigned to the same assignee as the present application divulges the method of fabricating battery stacks using fusible frames to make a unified battery housing.

BACKGROUND OF THE INVENTION

This invention pertains to mechanical elements of electrochemical batteries, and, more particularly, is concerned with an element for use in bipolar plate-type batteries.

As is well known, a battery includes a plurality of cells arranged in series to provide a voltage greater than that possible from a single cell alone. One type of electrochemical cell employs a reducible liquid cathode and includes a lithium anode, a carbon cathode structure, and a porous separator interposed between the lithium anode and the carbon current collector cathode structure. The assembly of the lithium anode, carbon cathode current collector structure and separator is exposed to an electrolytic solution including a reducible liquid cathode and a dissolved electrolyte solute. Suitable materials for the reducible liquid cathode are thionyl chloride and sulfonyl chloride. The electrolyte solute may be lithium tetrachloraluminate for example.

Furthermore, it is known that the anode and cathode current collector structure of adjacent cells may be on opposite sides of a conductive carrier plate or substrate. The assembly is called a bipolar plate.

A battery can be made with a multiplicity of bipolar plates arranged in a stack with the ends of the stack terminated by plates carrying either an anode or a cathode current collector structure. An insulation or separator made of a thin porous material such as a fiberglass sheet (glass paper) is interposed between facing anode and cathode current collector structures. A quantity of electrolyte solution is carried between the plates. The elements and electrolyte between adjacent carrier plates form a cell. Adjacent cells are connected in series through the carrier plates. To prevent short circuits between cells, it is important that the various plates be electrically insulated from each other, and that there is no communication of electrolyte solution between cells.

At the same time, the plates must be mechanically supported in their relative positions during normal and shock conditions.

In the above cited copending application, a method of assembly plates into a battery stack was disclosed in which frames are placed between plates. The frames overlap the periphery of the plates and are fused together to form a unified battery housing. This has been found to be an excellent method; however, care must be taken to assure alignment of plates and the flexible separators during assembly.

DESCRIPTION OF THE INVENTION

Figure 1:
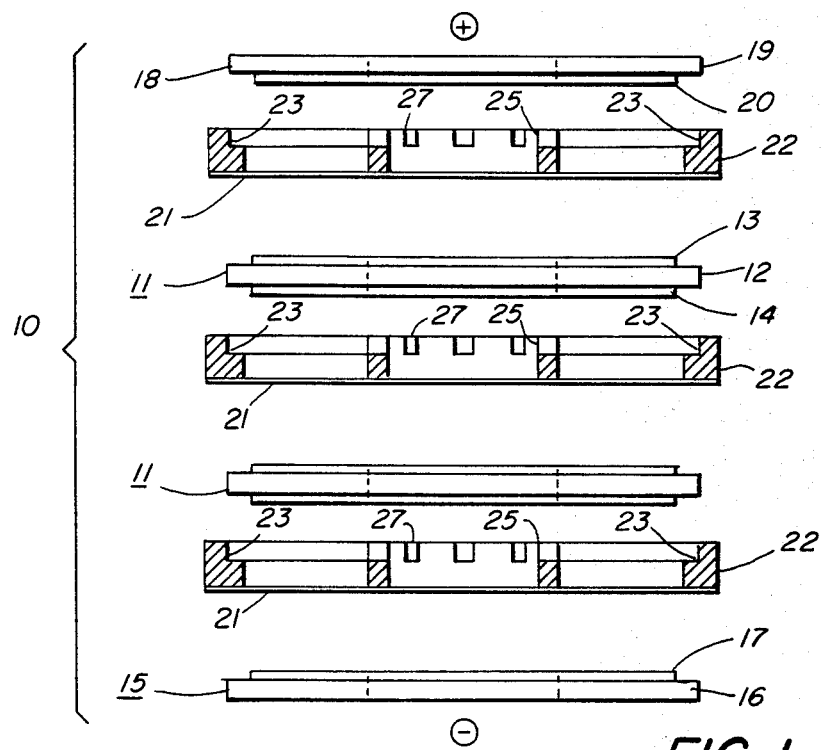
FIG. 1 is a view of the components of a battery prior to assembly.

FIG. 1 is an exploded view of a battery 10 having a plurality of bipolar plates arranged in a stack. Each bipolar plate 11 includes a conductive carrier plate 12 which carries on one side an anode structure 13 and on the other side a catalytic structure 14. The carrier 12 may be stainless steel; the anode structure 13 may be a sheet of lithium metal; and the catalytic structure 14 may be a layer of porous carbon.

At one end of the stack there is an end plate having a carrier plate 16 with only an anode structure 17. At the opposite end of the stack is an end plate 18 having a carrier plate 19 with only a catalytic structure 20.

The plates are orientated with the anode structures aligned in the same direction so that the anode structure of one plate faces the catalytic element of the adjacent plate.

Each anode structure is separate from the catalytic structure it faces by a porous separator 21 which electrically insulates the anode structure from the catalytic structure.

An electrolyte solution permeates the porous carbon catalytic structure and the porous separator. The electrolyte solution includes a reducible cathode solvent and a compatible electrolyte solute. The solvent may be thionyl chloride and sulfonyl chloride. The solute may be lithium tetrachloroaluminate.

The elements between adjacent carrier plates form an electrochemical cell. Contiguous cells are electrically connected in series through the conductive carrier plates forming a battery.

The end plate 15 with only an anode structure, functions as the negative terminal of the battery. The end plate 18 with only a cathode structure functions as the positive terminal of the battery.

It is important that there is no communication of electrolyte solution between cells. Electrolyte leakage between cells causes parasitic shorts which diminish the capacity of the battery. For this reason, the battery housing must seal the edges of the carrier plates. As divulged in the referenced copending application, a frame 22 is interposed between pairs of plates. Each frame overlaps the periphery of its associated carriers. If the carrier plates are circular, then the frames may be rings having an outside diameter greater than that of the diameter of the carrier plates and an inner diameter less than the diameter of the carrier plates.

The frames 22 are made of a material, such as polypropylene, which fuses under heat or chemical action.

Figure 2:
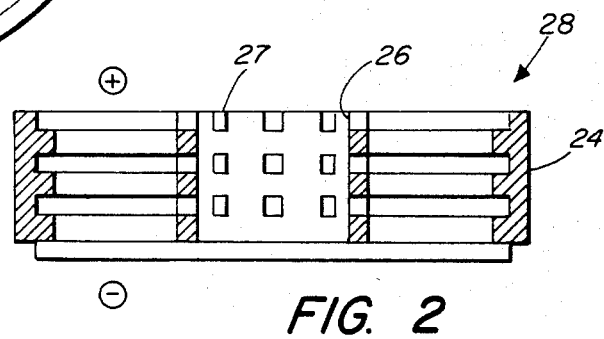
FIG. 2 represents the battery of FIG. 1 shown in cross-section after assembly.

The frames have a groove 23 grooved on one side to accept the carrier plates. The assemblage of bipolar plates, end plates, separators and integrated separators and frame is compressed. The frames are then fused together using a heat source or a solvent so that the rings form a unified battery housing 24 as seen in FIG. 2.

The electrolyte solution may be added to each cell during assembly, however the shelf life of lithium cells is limited due to the reactive nature of the material. In some applications, the electrolyte solution is introduced to the cells after assembly shortly before use to assume maximum battery capacity.

Provision may be made for post assembly introduction of electrolyte. For example, each plate except one end plate may have a central hole. The assembled battery has a cylindrical well extending along its length. The electrolyte solution may be in a reservoir (not shown) when the battery is to be left in reserve and released into the well to activate the battery.

As a feature of the invention, an inner frame 25 overlaps the hole periphery. The inner frames 25 are also made of fusible material. When assembled, the fused inner frames form the side 26 of the electrolyte well and supports the plates to prevent mechanical damage due to shock. The inner frames 25 are provided with notches 27 to allow the entry of electrolyte into the cells.

The alignment of the inner frame 25 and the outer frame 22 is critical. Slippage of a frame is possible during assembly, resulting in a defective battery. Another possible difficulty is that the thin separators 21 can wrinkle or slip.

Figure 3:
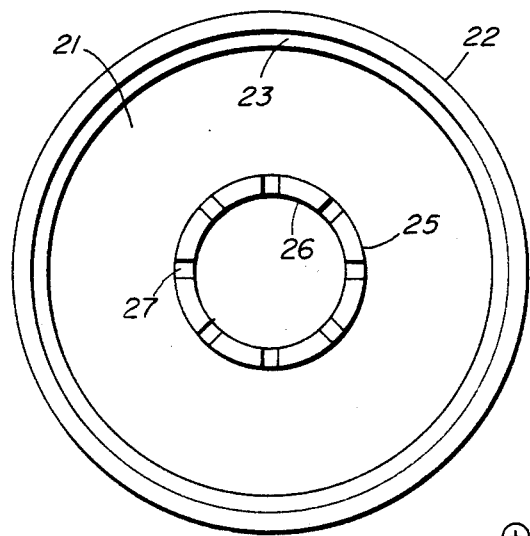
FIG. 3 illustrates an integrated frame separator which embodies the invention.

As an additional feature of the invention, both difficulties are overcome by integrating the outer frame 22 and inner frame 25 with a separator 21 cut from a sheet of glass paper or other electrically insulating and porous material. The outer and inner frames 22, 25 are placed on the separator 21 and heat bonded to it by applying localized heat, making an integrated structure 28, as best seen in FIG. 3.

The separator 21 maintains the correct spacing between the two frames 22, 25; while the frames, being more rigid, prevent the thin separator from folding.

Having described the preferred embodiment of the invention, we claim:

1. A structure for electrochemical batteries having a plurality of plates, comprised of:
    a first fusible frame sized to overlap the outer periphery of one of said plates; and
    a sheet of porous, electrically insulating material affixed to said first fusible frame wherein said sheet defines an inner hole and which further includes a second fusible frame sized to over lap the hole periphery, said sheet affixed to said second fusible frame.

2. The structure of claim 1 wherein said second fusible frame has grooves to allow passage of electrolyte in an assembled battery.

* * * * *